US012683237B2

(12) United States Patent
Shin et al.

(10) Patent No.: US 12,683,237 B2
(45) Date of Patent: Jul. 14, 2026

(54) BATTERY PACK AND DEVICE INCLUDING THE SAME

(71) Applicant: LG ENERGY SOLUTION, LTD., Seoul (KR)

(72) Inventors: Juhwan Shin, Daejeon (KR); Hyoungsuk Lee, Daejeon (KR); Donghyun Kim, Daejeon (KR); Byung Do Jang, Daejeon (KR); Yongho Chun, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 611 days.

(21) Appl. No.: 18/025,341

(22) PCT Filed: May 25, 2022

(86) PCT No.: PCT/KR2022/007403
§ 371 (c)(1),
(2) Date: Mar. 8, 2023

(87) PCT Pub. No.: WO2022/270780
PCT Pub. Date: Dec. 29, 2022

(65) Prior Publication Data
US 2024/0030547 A1    Jan. 25, 2024

(30) Foreign Application Priority Data
Jun. 21, 2021    (KR) ........................ 10-2021-0080122

(51) Int. Cl.
*H01M 50/35*    (2021.01)
*H01M 50/211*    (2021.01)
(Continued)

(52) U.S. Cl.
CPC ....... *H01M 50/358* (2021.01); *H01M 50/211* (2021.01); *H01M 50/3425* (2021.01); *H01M 50/502* (2021.01)

(58) Field of Classification Search
CPC ............. H01M 50/358; H01M 50/367; H01M 50/375; H01M 50/35; H01M 50/502; (Continued)

(56) References Cited

U.S. PATENT DOCUMENTS

2018/0272853 A1    9/2018    Wang et al.
2019/0198952 A1*    6/2019    Choi ................... H01M 50/271
(Continued)

FOREIGN PATENT DOCUMENTS

CN    108630843 A    10/2018
CN    109713176 A    5/2019
(Continued)

OTHER PUBLICATIONS

International Search Report (PCT/ISA/210) issued in PCT/KR2022/007403, dated Sep. 1, 2022.

*Primary Examiner* — Raymond Alejandro
(74) *Attorney, Agent, or Firm* — Birch, Stewart, Kolasch & Birch, LLP

(57)    ABSTRACT

A battery pack of the present disclosure includes a lower pack frame on which a plurality of battery modules are mounted; and an upper pack frame located on an upper part of the plurality of battery modules, wherein the lower pack frame includes a bottom part in contact with a lower surface of the plurality of battery modules and a frame part in contact with at least one side surface of at least one of the plurality of battery modules, wherein the frame part comprises a side surface frame extending from an edge of the bottom part toward the upper part, and an inner frame located inside the side surface frame, wherein the inner (Continued)

frame includes at least one venting hole that penetrates an outer surface of the inner frame, and wherein the inner frame serves as a path through which a gas generated in the at least one of the plurality of battery modules moves.

14 Claims, 8 Drawing Sheets

(51) Int. Cl.

| | | |
|---|---|---|
| *H01M 50/342* | (2021.01) | |
| *H01M 50/358* | (2021.01) | |
| *H01M 50/502* | (2021.01) | |

(58) Field of Classification Search
CPC ............. H01M 50/507; H01M 50/503; H01M 50/211; H01M 50/213; H01M 50/3425
See application file for complete search history.

(56) References Cited

U.S. PATENT DOCUMENTS

| | | | |
|---|---|---|---|
| 2020/0148066 A1 | 5/2020 | Sekar et al. | |
| 2020/0185672 A1 | 6/2020 | Seo et al. | |
| 2020/0220130 A1 | 7/2020 | Kume et al. | |
| 2020/0381694 A1* | 12/2020 | Rath | ................. H01M 10/6554 |
| 2020/0395643 A1* | 12/2020 | Seo | ...................... H01M 50/211 |
| 2022/0059901 A1 | 2/2022 | Ren et al. | |
| 2022/0077539 A1 | 3/2022 | Ren et al. | |
| 2022/0123423 A1 | 4/2022 | Wang et al. | |

FOREIGN PATENT DOCUMENTS

| | | |
|---|---|---|
| CN | 209357817 U | 9/2019 |
| CN | 110190211 B1 | 3/2020 |
| CN | 111384328 A | 7/2020 |
| CN | 211879432 U | 11/2020 |
| CN | 112331992 A | 2/2021 |
| CN | 112531246 A | 3/2021 |
| CN | 112701410 A | 4/2021 |
| JP | 9-109692 A | 4/1997 |
| JP | SP2012-156057 A | 8/2012 |
| JP | 2017-54866 A | 3/2017 |
| KR | 10-1831817 B1 | 2/2018 |
| KR | 10-2018-0112618 A | 10/2018 |
| KR | 10-2065099 B1 | 1/2020 |
| WO | WO 2019/039260 A1 | 2/2019 |
| WO | WO 2020/134070 A1 | 7/2020 |

* cited by examiner

[FIG. 1]
<u>1000</u>
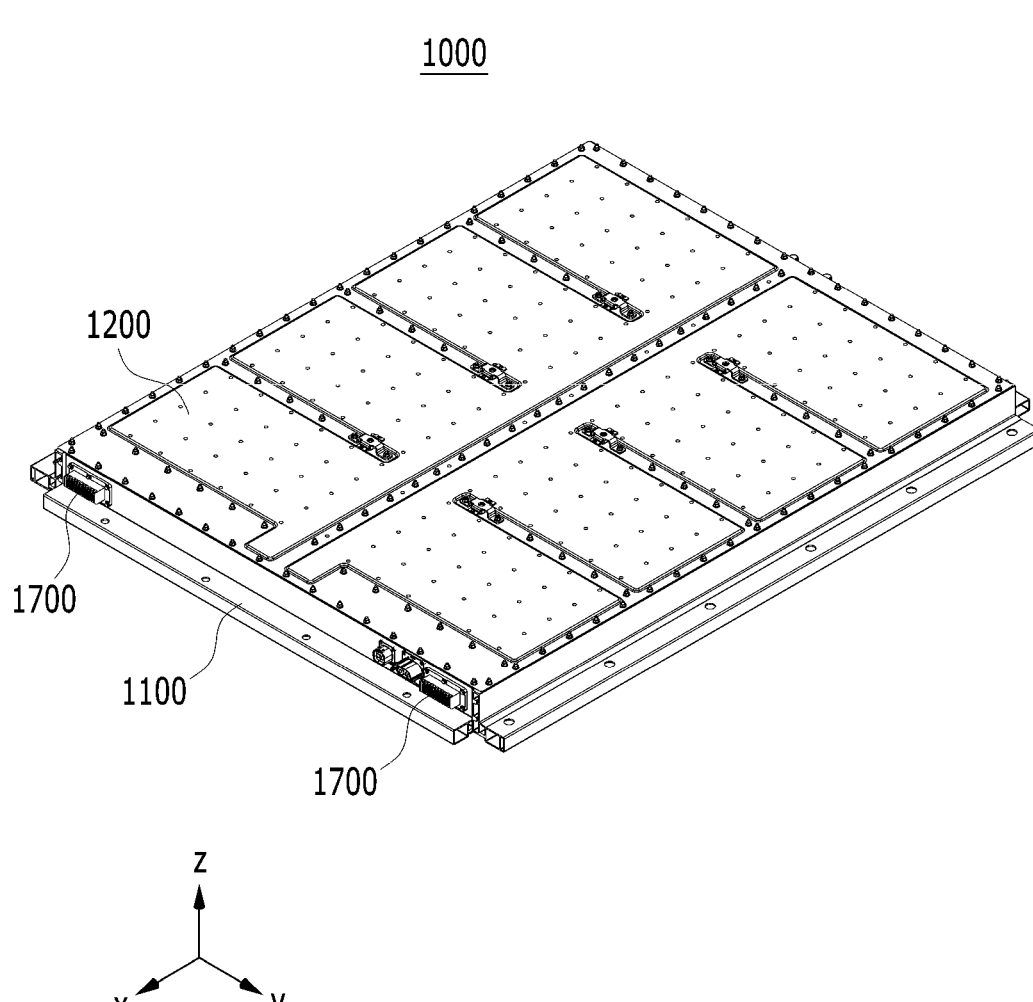

[FIG. 2]
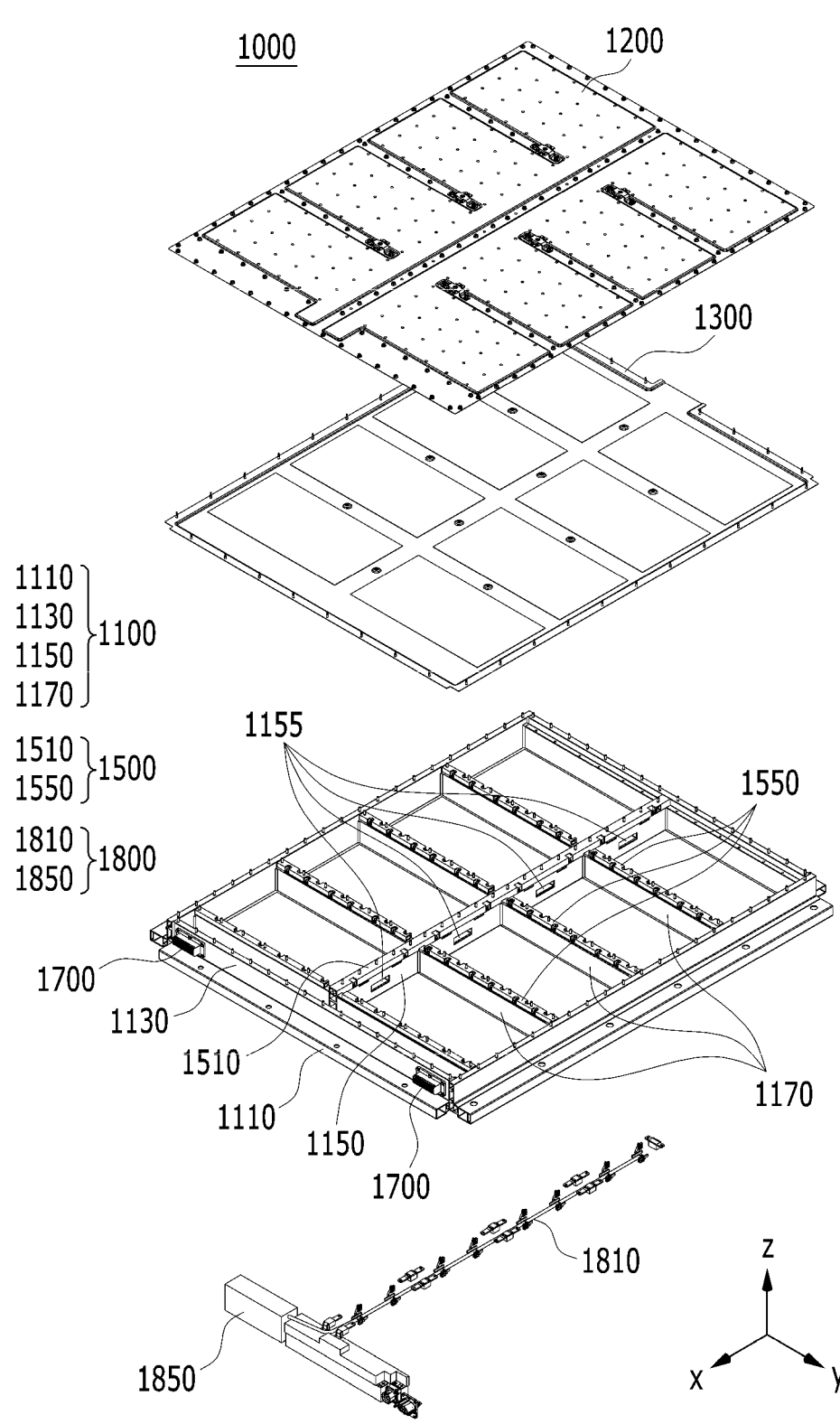

[FIG. 3]
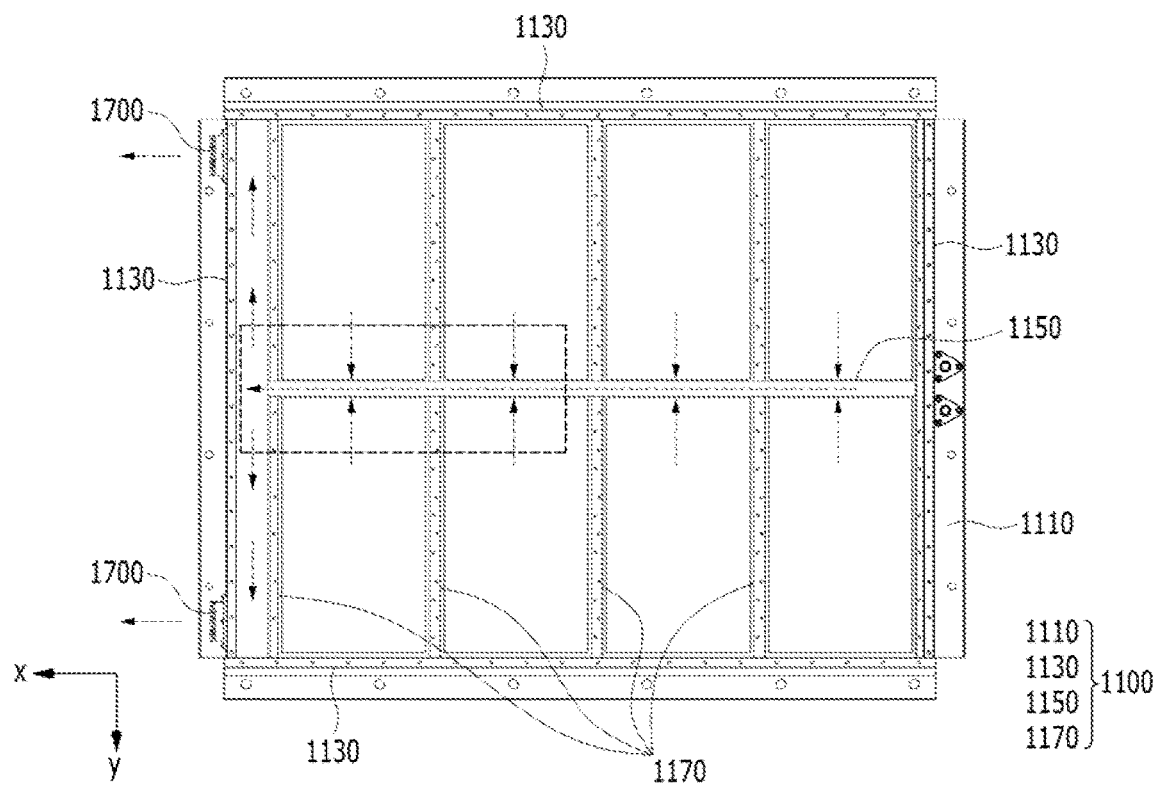

[FIG. 4]
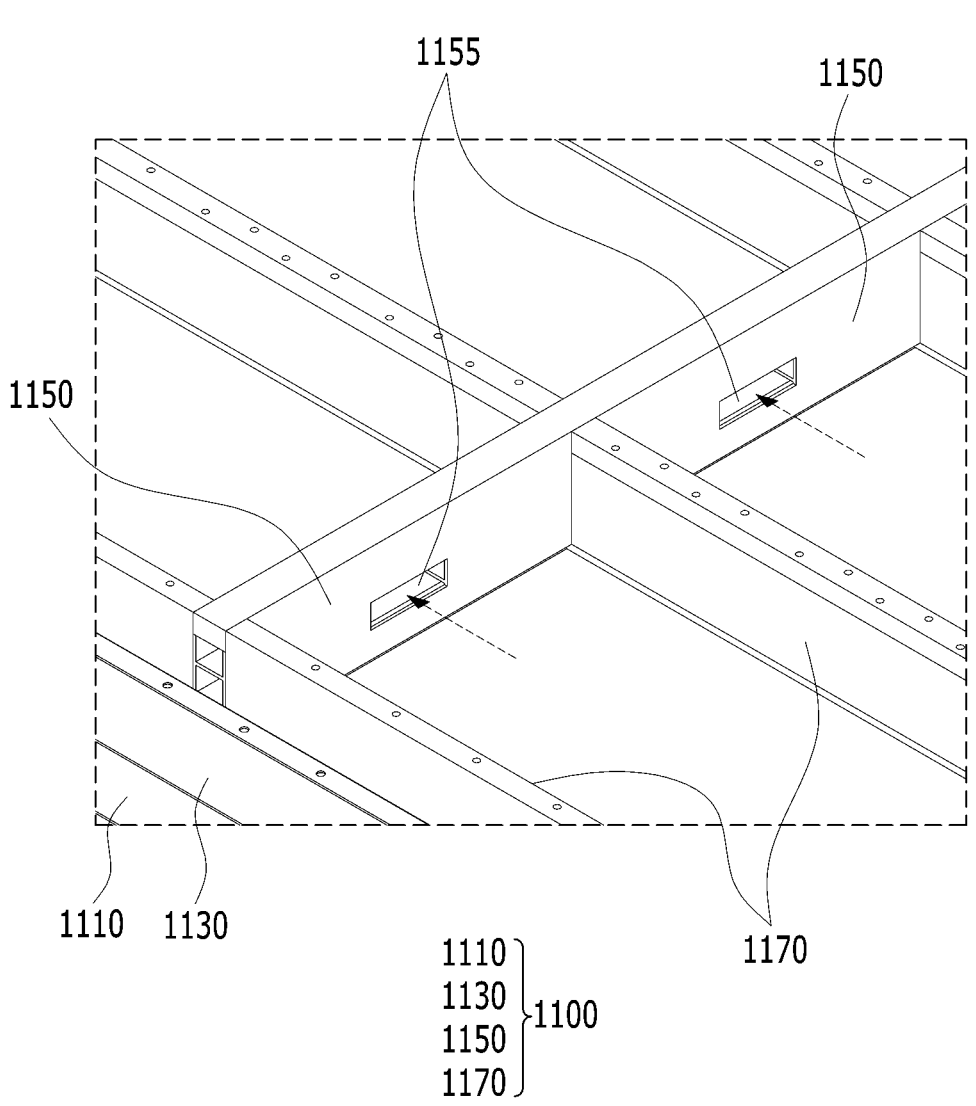

[FIG. 5]
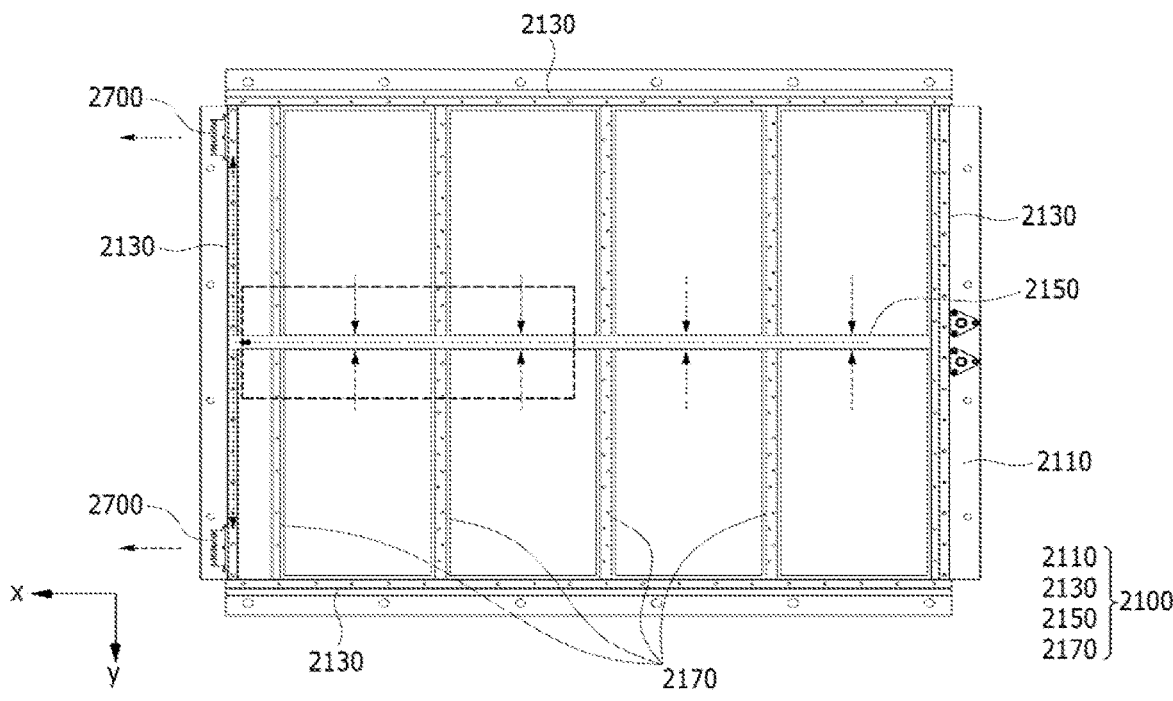

[FIG. 6]
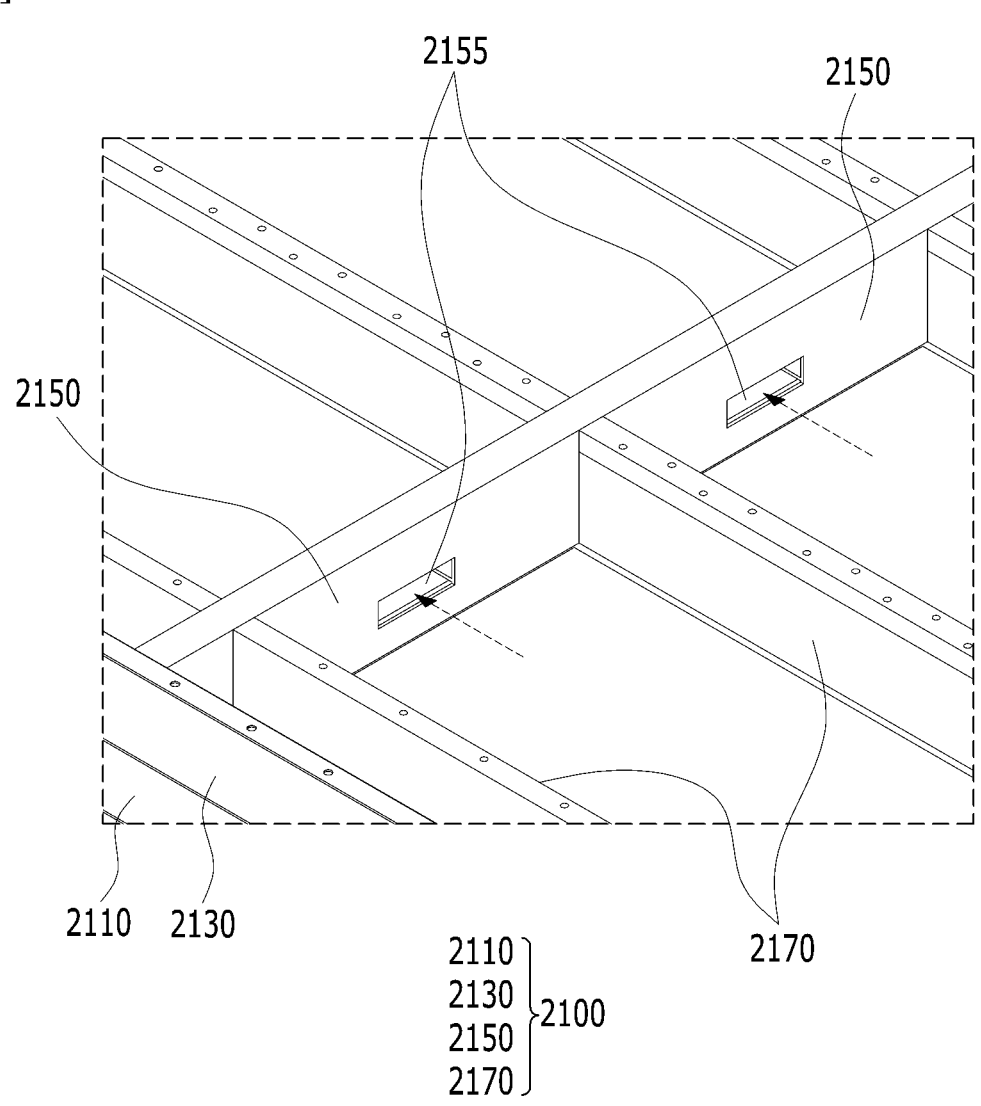

[FIG. 7]
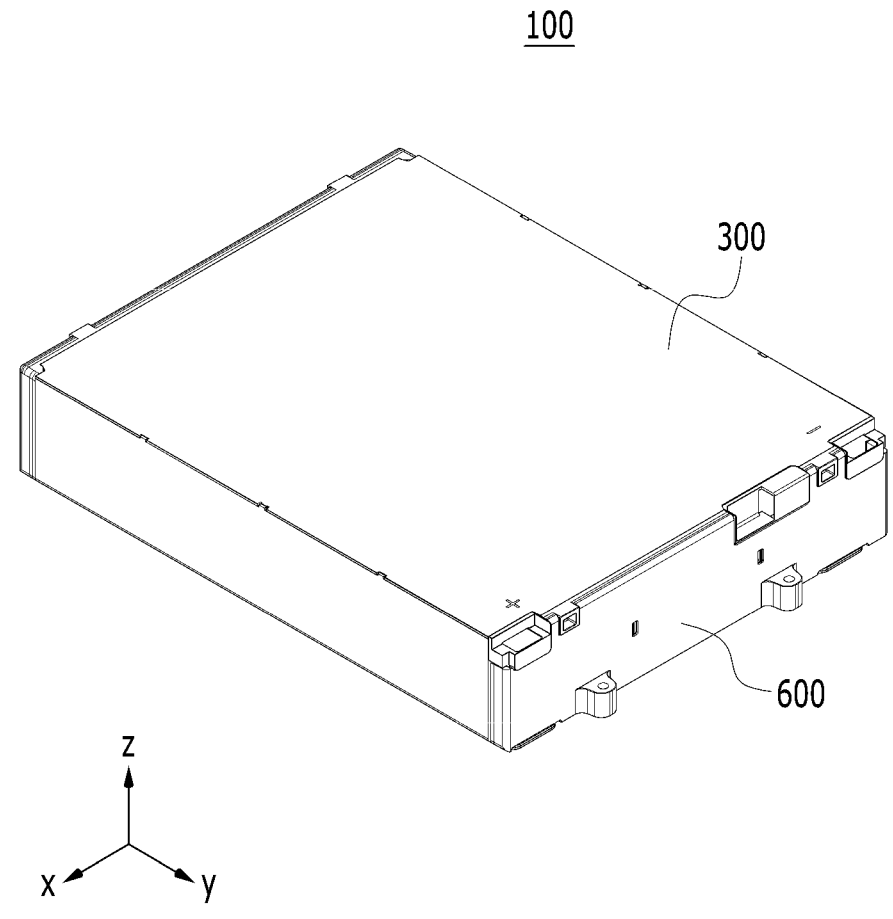

[FIG. 8]
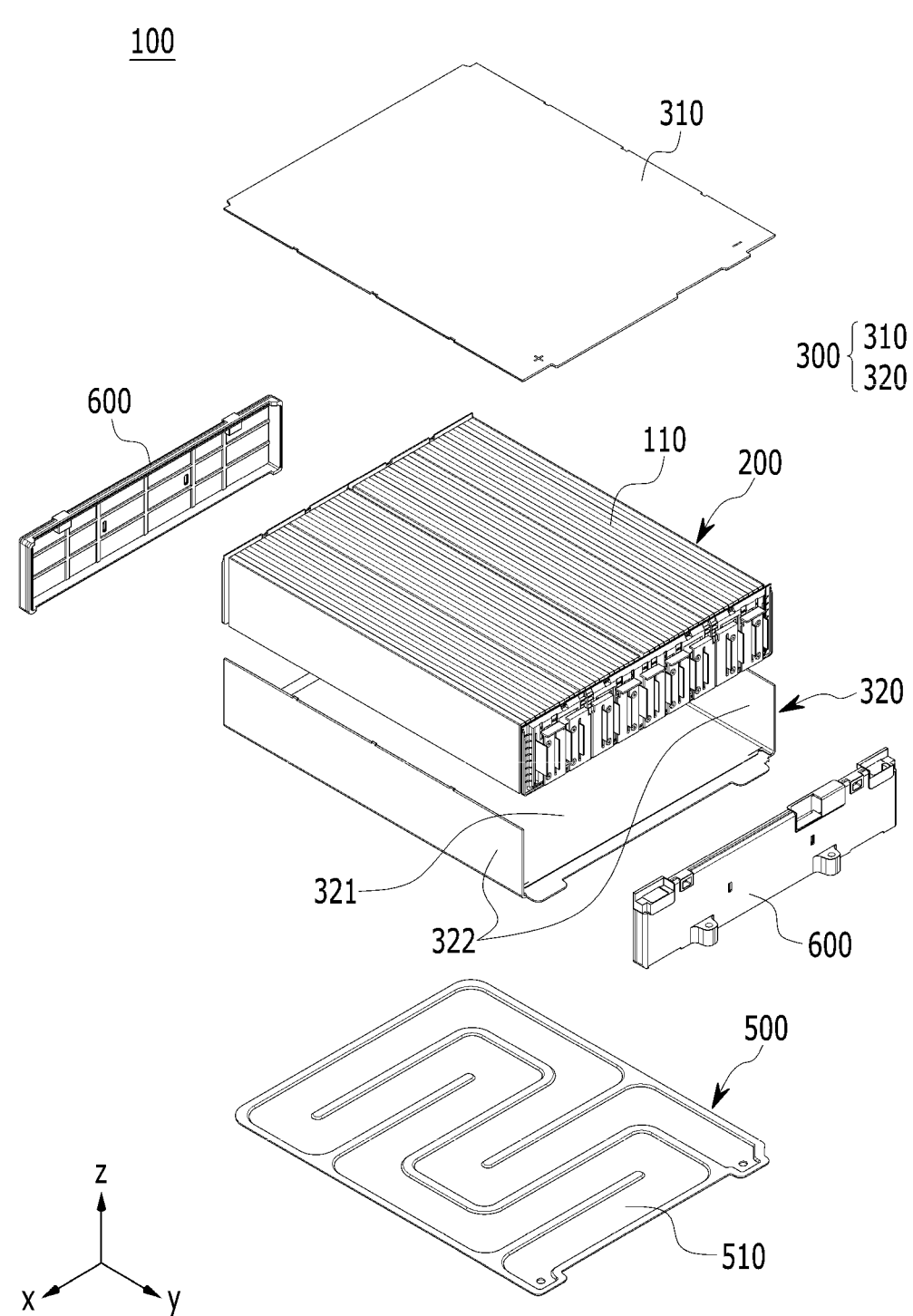

BATTERY PACK AND DEVICE INCLUDING THE SAME

TECHNICAL FIELD

Cross Citation with Related Application

This application claims the benefit of Korean Patent Application No. 10-2021-0080122 filed on Jun. 21, 2021 with the Korean Intellectual Property Office, the content of which is incorporated herein by reference in its entirety.

The present disclosure relates to a battery pack and a device including the same, and more particularly, to a battery pack that effectively discharges the generated gas and flame to the outside of the battery pack while preventing a heat propagation phenomenon between adjacent battery modules when gas and flame are generated in a part of battery modules, and a device including the same.

BACKGROUND

Secondary batteries, which are easily applied to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Generally, the lithium secondary battery may be classified based on the shape of the exterior material into a cylindrical or prismatic secondary battery in which the electrode assembly is mounted in a metal can, and a pouch-type secondary battery in which the electrode assembly is mounted in a pouch made of an aluminum laminate sheet.

Recently, along with a continuous rise of the necessity for a large-capacity secondary battery structure, including the utilization of the secondary battery as an energy storage source, there is a growing demand for a battery pack of a medium- and large-sized module structure which is an assembly of battery modules in which a plurality of secondary batteries are connected in series or in parallel. In such a battery module, a plurality of battery cells are connected to each other in series or in parallel to form a battery cell stack, thereby improving capacity and output. In addition, a plurality of battery modules may be mounted together with various control and protection systems such as a BMS (battery management system) and a cooling system to form a battery pack.

In particular, the battery pack is composed of a structure made by combining a plurality of battery modules, and when a part of battery modules become an overvoltage, overcurrent or overheat state, the safety and operating efficiency of the battery pack may be problematic. In particular, in order to improve a mileage of an electric vehicle, for example, the battery pack capacity tends to gradually increase. As the energy inside the pack increases accordingly, it is necessary to design a structure that meets the strengthened safety standards and ensures the safety of vehicles and drivers. For this purpose, particularly, in order to prevent a thermal runaway within the battery pack and a heat propagation phenomenon between battery cells in advance, there is a growing need for a structure capable of effectively discharging gases and flames generated in a part of battery cells and minimizing the damage.

DETAILED DESCRIPTION OF THE INVENTION

Technical Problem

The present disclosure has been designed to solve the above-mentioned problems, and an object of the present disclosure is to provide a battery pack that effectively discharges the generated gas and flame to the outside of the battery pack while preventing a heat propagation phenomenon between adjacent battery modules when gas and flame are generated in a part of battery modules, and a device including the same.

The objects of the present disclosure are not limited to the above-mentioned objects, and other objects which are not described herein should be clearly understood by those skilled in the art from the following detailed description and the accompanying drawings.

Technical Solution

According to one embodiment of the present disclosure, there is provided a battery pack including: a lower pack frame on which a plurality of battery modules are mounted; and an upper pack frame located on an upper part of the plurality of battery modules, wherein the lower pack frame includes a bottom part in contact with a lower surface of the plurality of battery modules and a frame part in contact with at least one side surface of at least one of the plurality of battery modules, wherein the frame part includes a side surface frame extending from an edge of the bottom part toward the upper part, and an inner frame located inside the side surface frame, wherein the inner frame includes at least one venting hole that penetrates an outer surface of the inner frame, and wherein the inner frame serves as a path through which a gas generated in the at least one of the plurality of battery modules moves.

The plurality of battery modules may be partitioned from each other by the side surface frame and the inner frame.

The inner frame may include a horizontal beam extending along a longitudinal direction of the lower pack frame, and at least two vertical beams extending in a direction perpendicular to the horizontal beam.

The at least one venting hole may be formed on an outer surface of the horizontal beam located between adjacent vertical beams among the at least two vertical beams, and the horizontal beam may include a path through which the gas generated in the at least one of the plurality of battery modules moves.

The at least one venting hole may penetrate the outer surface of the horizontal beam.

At least one rupture part may be formed on one surface of the side surface frame extending in a direction perpendicular to the horizontal beam, and the at least one rupture part may be ruptured when a pressure inside the battery pack reaches a certain level or higher.

The at least two vertical beams located adjacent to one surface of the side surface frame on which the rupture part is formed may be spaced apart from each other.

One end of the horizontal beam extends up to one vertical beam located adjacent to one surface of the side surface frame in which the rupture part is formed from among the at least two vertical beams, and the one end of the horizontal beam may be opened towards the side surface frame.

One end of the horizontal beam extends up to one surface of the side surface frame in which the at least one rupture part is formed, and the one end of the horizontal beam is in contact with the one surface of the side surface frame, with the one surface of the side surface frame and the one end of the horizontal beam in communication with each other.

The battery pack may further include a gasket part located between the inner frame and the upper pack frame.

The inner frame may include a horizontal beam extending along a longitudinal direction of the lower pack frame, and at least two vertical beams extending in a direction perpendicular to the horizontal beam.

The gasket part includes a first gasket part and a second gasket part, and the first gasket part may be located on the horizontal beam, and the second gasket part is located on the at least two vertical beams, respectively.

The battery pack may further include an inter busbar that is electrically connected to the plurality of battery modules, wherein the inter busbar extends along at least one of the first gasket part and the second gasket part, and may be mounted on at least one of the first gasket part and the second gasket part.

The inter busbar may be sealed with a heat resistant rubber.

According to another embodiment of the present disclosure, there is provided a device includes the above-mentioned battery pack.

Advantageous Effects

According to the embodiments, the present disclosure relates to a battery pack including a frame part that guides a discharge direction of gas and flame, and a device including the same, wherein when the gas and flame are generated in a part of battery modules, the gas and flame can be guided and discharged in a certain direction, and thus, the generated gas and flame can be effectively discharged to outside of the battery pack while preventing a heat propagation phenomenon between adjacent battery modules.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view which shows a battery pack according to an embodiment of the present disclosure;

FIG. 2 is an exploded perspective view which shows components of the battery pack of FIG. 1;

FIG. 3 is a diagram which shows an upper surface of the battery pack of FIG. 1 in a state in which the upper pack frame is eliminated;

FIG. 4 is an enlarged view of a dotted line area of FIG. 3;

FIG. 5 is a diagram which shows an upper surface of the battery pack in a state in which the upper pack frame is eliminated according to another embodiment of the present disclosure;

FIG. 6 is an enlarged view of a dotted line area of FIG. 5;

FIG. 7 is a perspective view which shows a battery module mounted on the battery pack of FIG. 1; and FIG. 8 is an exploded perspective view of the battery module of FIG. 7.

DETAILED DESCRIPTION OF THE EMBODIMENTS

Hereinafter, various embodiments of the present disclosure will be described in detail with reference to the accompanying drawings so that those skilled in the art can easily carry out them. The present disclosure can be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Below, the battery pack according to an embodiment of the present disclosure will be described. However, a description will be given on the basis of the front and rear surfaces of the battery pack, but is not necessarily limited thereto. Even in the case of the rear surface, it will be described in the same or similar manner.

FIG. 1 is a perspective view which shows a battery pack according to an embodiment of the present disclosure. FIG. 2 is an exploded perspective view which shows components of the battery pack of FIG. 1.

Referring to FIGS. 1 and 2, the battery pack 1000 according to an embodiment of the present disclosure includes a lower pack frame 1100 on which a plurality of battery modules 100 (FIG. 7) are mounted; and an upper pack frame 1200 located on the upper part of the battery module 100 (FIG. 7). Here, the lower pack frame 1100 and the upper pack frame 1200 may be coupled to each other by a method such as welding to seal the inside of the battery pack 1000.

Further, the battery pack 1000 may further include a reinforcing frame 1300 located between the lower pack frame 1100 and the upper pack frame 1200. Here, the reinforcing frame 1300 may be located between the plurality of battery modules 100 (FIG. 7) and the upper pack frame 1200 to reinforce structural stiffness of the battery pack 1000. However, if necessary, the reinforcing frame 1300 may be omitted from the battery pack 1000.

Further, the lower pack frame 1100 includes a bottom part 1110 in contact with the lower surface of the battery module 100 (FIG. 7) and frame parts 1130, 1150 and 1170 in contact with at least one side surface of the battery module 100 (FIG. 7). Here, the bottom part 1110 and the frame parts 1130, 1150 and 1170 may be integrated with each other, or may be fixed to each other by a separate fastening method such as welding or bonding.

Here, the frame parts 1130, 1150 and 1170 may be formed of a heat insulating member. As an example, the frame parts 1130, 1150 and 1170 may be constituted of an aluminum extrusion structure. As another example, the frame parts 1130, 1150 and 1170 may be are made of a dissimilar metal bonding material such as clad metal, or may be a structure containing an insulating material such as aerogel or EPP (Expanded Polypropylenes) foam. However, the present disclosure is not limited thereto, and the frame parts 1130, 1150 and 1170 can be used without limitation as long as they are made of a heat insulating material having a predetermined stiffness.

Further, the frame parts 1130, 1150 and 1170 may include a side surface frame 1130 extending from the edge of the bottom part 1110 toward the upper part, and the inner frames 1150 and 1170 located inside the side surface frame 1130.

Here, the plurality of battery module 100 (FIG. 7) may be partitioned each other by a side surface frame 1130 and the inner frames 1150 and 1170. More specifically, the plurality of battery modules 100 (FIG. 7) may be located apart from each other by the side surface frame 1130 and the inner frames 1150 and 1170.

Further, the inner frames 1150 and 1170 may include a horizontal beam 1150 extending along the longitudinal direction (x-axis direction) of the lower pack frame 1100, and at least two vertical beams 1170 extending in a direction (y-axis direction) perpendicular to the horizontal beam 1150. As an example, the vertical beam 1170 includes a pair of first vertical beams and second vertical beams with the horizontal beam 1150 interposed therebetween, so that the first vertical beam and the second vertical beam can be respectively attached to the horizontal beam 1150. Here, the horizontal beam 1150 and at least two vertical beams 1170 are integrated with each other, or may be fixed to each other by a separate fastening method such as welding or bonding.

More specifically, the length of the horizontal beam 1150 and the vertical beam 1170, and the distance between the vertical beams 1170 adjacent to each other among at least two vertical beams 1170 can be adjusted according to the size of the battery module 100 (FIG. 7).

With the above configuration, the battery pack 1000 according to the present embodiment can effectively prevent the heat propagation phenomenon between adjacent battery modules 100 (FIG. 7) even if an ignition phenomenon occurs in a part of battery modules 100 (FIG. 7), because a plurality of battery modules 100 (FIG. 7) can be located apart from each other in a region partitioned by the frame parts 1130, 1150 and 1170.

Additionally, the battery pack 1000 according to the present embodiment may further include a gasket part 1500 located between the inner frames 1150 and 1170 and the upper pack frame 1200.

More specifically, the gasket part 1500 includes a first gasket part 1510 and a second gasket part 1550. Here, the first gasket part 1510 is located on the horizontal beam 1150, and the second gasket part 1550 may be respectively located on at least two vertical beams 1170. More specifically, the first gasket part 1510 may extend along the longitudinal direction of the horizontal beam 1150, and the second gasket part 1550 may extend along the longitudinal direction of the vertical beam 1170.

Further, the gasket part 1500 is attached and fixed to one surface of the inner frames 1150 and 1170 and one surface of the upper pack frame 1200, respectively, or may be fitted and fixed into separate mounting grooves formed on one surface of the inner frames 1150 and 1170 and one surface of the upper pack frame 1200. However, the fixing method of the gasket part 1500 is not limited thereto, and can be included in the present embodiment as long as it is a method in which the gasket part 1500 can be stably fixed between the upper pack frame 1200 and the inner frames 1150 and 1170.

As an example, the gasket part 1500 may be made of rubber, ethylene propylene rubber (EPDM), and a silicone material. As another example, the gasket part 1500 may be made of a thin metal material. However, the material of the gasket part 1500 is not limited thereto, and can be included in the present embodiment as long as it is a material that can seal between the upper pack frame 1200 and the inner frames 1150 and 1170.

With the above configuration, the battery pack 1000 according to the present embodiment can seal between the upper pack frame 1200 and the inner frames 1150 and 1170 by locating the gasket part 1500 between the upper pack frame 1200 and the inner frames 1150 and 1170. In addition, as it is sealed between the upper pack frame 1200 and the inner frames 1150 and 1170, it is possible to effectively prevent the gas and/or flame generated by the ignition phenomenon of some battery modules 100 (FIG. 7) from being transmitted to the adjacent battery module 100 (FIG. 7).

Further, the battery pack 1000 according to the present embodiment may be configured to mount the electrical component 1800 inside the lower pack frame 1100. More specifically, the electronic component 1800 may include an inter busbar 1810 and a low voltage (LV) wire 1850. However, the electronic component 1800 is not limited to the above-mentioned components, and other components may also be included.

Here, the inter busbar 1810 may be electrically connected to the plurality of battery modules. The inter busbar 1810 may be located on the horizontal beam 1150. More specifically, the inter busbar 1810 is extended along the first gasket part 1510, but can be mounted on the first gasket part 1510. Further, the inter busbar 1810 is extended along the second gasket part 1550, but can be mounted on the second gasket part 1550.

As an example, although it is not shown in FIG. 2, a plurality of grooves are formed in the first gasket part 1510 and/or the second gasket part 1550, so that the inter busbar 1810 can be mounted to the first gasket part 1510 and/or the second gasket part 1550 along the plurality of grooves. Further, the LV wire 1850 may be mounted between the side surface frame 1130 and the vertical beam 1180 located adjacent to the side surface frame 1130 among the at least two vertical beams 1180.

However, the position of the electronic component 1800 is not limited to the above-mentioned contents, and can be appropriately arranged at various positions as needed.

As an example, the electrical component 1800 may be sealed with a heat resistant rubber. That is, the inter busbar 1810 and the LV wire 1850 may be sealed with a heat resistant rubber. However, the material for sealing the electrical component 1800 is not limited thereto, and can be included in the present embodiment as long as it is a material having heat resistance.

With the above configuration, the battery pack 1000 according to the present embodiment can prevent the electrical components 1800 from being damaged by gas and/or flames generated by the ignition phenomenon of some battery modules 100 (FIG. 7), because the electrical component 1800 is mounted inside the lower pack frame 1100, with the electrical component 1800 being sealed with a heat resistant material.

FIG. 3 is a diagram which shows an upper surface of the battery pack of FIG. 1 in a state in which the upper pack frame is eliminated. FIG. 4 is an enlarged view of a dotted line area of FIG. 3.

Referring to FIGS. 2 to 4, the inner frames 1150 and 1170 includes at least one venting hole 1155 that penetrates the outer surface of the inner frames 1150 and 1170, and the inner frames 1150 and 1170 serve as a path through which the gas generated from the battery module moves.

Here, the venting hole 1155 may be formed in the horizontal beam 1150. More specifically, the venting hole 1155 may be formed through the outer surface of the horizontal beam 1150. In other words, the venting hole 1155 may be a hole to be formed by eliminating a part of the outer surface of the horizontal beam 1150. Here, the venting hole 1155 may be formed on the outer surface of the horizontal beam 1150 located between the adjacent vertical beams 1170 among the at least two vertical beams 1170. More preferably, the venting hole 1155 may be respectively formed on the outer surface of the horizontal beam 1150 located between the adjacent vertical beams 1170 among the at least two vertical beams 1170.

Further, at least one rupture part 1700 may be formed on one surface of the side surface frame 1130 extending in a direction perpendicular to the horizontal beam 1150. The rupture part 1700 may rupture when the pressure inside the battery pack 1000 reaches a certain level or higher. More specifically, the rupture part 1700 may include a rupture surface (not shown) configured to rupture when the pressure of the inflowing gas exceeds a certain pressure, like as a rupture disc. However, the structure of the rupture part 1700 is not limited thereto, and can be included in the present embodiment as long as it is configured to communicate with the side surface frame 1130 to allow the inner gas to be discharged to the outside.

Referring to FIGS. 2 to 4, the vertical beams 1170 located adjacent to one surface of the side surface frame 1130 on which the rupture part 1700 is formed may be spaced apart from each other. More specifically, the space between the vertical beam 1170 located adjacent to one surface of the side surface frame 1130 on which the rupture part 1700 is formed may serve as a path through which the gas discharged from the inner frames 1150 and 1170 moves.

As an example, one end of the horizontal beam 1150 extends to the vertical beam 1170 located adjacent to one side of the side surface frame 1130 on which the rupture part 1700 is formed, and one end of the horizontal beam 1150 may be opened toward the side surface frame 1130. That is, the gas and/or flame flowed into the horizontal beam 1150 may be discharged toward the side surface frame 1130 according to the pressure difference through one end of the horizontal beam 1150 that is opened toward the side surface frame 1130.

In other words, referring to FIGS. 3 and 4, the gas and/or flame generated from the battery module 100 (FIG. 7) mounted on the lower pack frame 1100 can be discharged to the venting hole 1155 facing one surface of the battery modules 100 (FIG. 7) due to the pressure difference. Further, the gas and/or flame that has flowed into the horizontal beam 1150 through the venting hole 1155 can move along the longitudinal direction of the horizontal beam 1150. Further, the gas and/or flame that has flowed into the horizontal beam

1150 may be discharged through one end of the horizontal beam 1150 that is opened toward the side surface frame 1130.

Further, the gas and/or flame discharged through one end of the horizontal beam 1150 may be flowed into the space between the vertical beam 1170 located adjacent to one surface of the side surface frame 1130 on which the rupture part 1700 is formed. Additionally, when the pressure in the space between the vertical beam 1170 located adjacent to one surface of the side surface frame 1130 on which the rupture part 1700 is formed reaches a certain level or higher, the rupture part 1700 ruptures and the gas inside the battery pack 1000 may be discharged to the outside of the battery pack 1000.

Next, in the battery pack according to another embodiment of the present disclosure, the lower pack frame 2100 including a bottom part 2110 and the gas discharge path will be mainly described. However, the battery pack according to the present embodiment may be described mostly in the same manner as the above-mentioned battery pack 1000, and the parts that are different from the battery pack 1000 will be mainly described.

FIG. 5 is a diagram which shows an upper surface of the battery pack in a state in which the upper pack frame is eliminated according to another embodiment of the present disclosure. FIG. 6 is an enlarged view of a dotted line area of FIG. 5.

Referring to FIGS. 5 and 6, the vertical beams 2170 located adjacent to one surface of the side surface frame 2130 on which the rupture part 2700 is formed may be spaced apart from each other. However, the present disclosure is not limited thereto, and the vertical beams 2170 located adjacent to one surface of the side surface frame 2130 on which the rupture part 2700 is formed may be located adjacent to each other.

Here, one end of the horizontal beam 2150 extends to one surface of the side surface frame 2130 in which the rupture part 2700 is formed, and one end of the horizontal beam 2150 is in contact with one surface of the side surface frame 2130, wherein one surface of the side surface frame 2130 and one end of the horizontal beam 2150 may be communicated with each other. That is, through one end of the horizontal beam 2150 that is opened toward the side surface frame 2130, the gas and/or flame that has flowed into the horizontal beam 2150 may be discharged toward the side surface frame 2130 according to a pressure difference.

In other words, referring to FIGS. 5 and 6, the gas and/or flame generated from the battery module 100 (FIG. 7) mounted on the lower pack frame 2100 can be discharged to a venting hole 2155 facing one surface of the battery module 100 (FIG. 7) by a pressure difference. Further, the gas and/or flame flowed into the horizontal beam 2150 through the venting hole 2155 may move along the longitudinal direction of the horizontal beam 2150. Further, the gas and/or flame flowed into the horizontal beam 2150 may be discharged toward the side surface frame 2130 in which the rupture part 2700 is formed.

In addition, when the internal pressure of the side surface frame 2130 in which the rupture part 2700 is formed and/or the flame discharged toward the side surface frame 2130 in which the rupture part 2700 is formed reaches a certain level or higher, the rupture part 2700 ruptures and the gas inside the side surface frame 2130 may be discharged to the outside.

With the above configuration, the battery pack 1000 according to the present embodiment can discharge the gas and/or flame generated by the ignition phenomenon of some battery modules 100 (FIG. 7) in the direction guided in advance through the gas discharge path formed in the lower pack frame 1100, so that the safety of the battery pack 1000 can also be further improved while preventing heat propagation phenomenon between adjacent battery modules 100 (FIG. 7).

FIG. 7 is a perspective view which shows a battery module mounted on the battery pack of FIG. 1. FIG. 8 is an exploded perspective view of the battery module of FIG. 7.

Referring to FIGS. 2, 7 and 8, the plurality of battery modules 100 included in the battery pack 1000 according to the present embodiment may be mounted on the lower pack frame 1100. More specifically, the plurality of battery modules 100 may be respectively mounted in regions partitioned by the side surface frame 1130 and the inner frames 1150 and 1170. Here, the battery module 100 may be arranged so that the front or rear surface of the battery module 100 faces the venting hole 1155, and the arrangement direction of the battery module 100 is not limited thereto and may be appropriately changed as needed.

As an example, the battery module 100 includes a battery cell stack 200 in which a plurality of battery cells 110 are stacked, a module frame 300 for housing the battery cell stack 200 and a heat sink 500 located at the bottom part of the module frame 300 as shown in FIGS. 7 and 8. As another example, the battery module 100 may have a structure in which the heat sink 500 is omitted from among the above-mentioned components.

Wherein, the battery cell 110 is preferably a pouch-type battery cell. As an example, the battery cell 110 can be manufactured by housing the electrode assembly in a pouch case of a laminated sheet containing a resin layer and a metal layer, and then heat-sealing a sealing part of the pouch case. Such a battery cell 110 may be formed in a rectangular sheet-like structure. Such a battery cell 110 may be configured by a plurality of number, and the plurality of battery cells 110 can be stacked so as to be electrically connected to each other, thereby forming a battery cell stack 200. Here, the number of battery cells 110 constituting the battery cell stack 200 may be adjusted depending on the case.

The module frame 300 may include an upper cover 310 and a U-shaped frame 320. Here, the U-shaped frame 320 may include a bottom part 321 and two side parts 322 extending upward from both ends of the bottom part. At this time, the bottom part may cover the lower surface of the battery cell stack 200, and the side surface part may cover the side surface of the battery cell stack 200. The upper cover 310 is coupled to the U-shaped frame 320 by welding or the like in a state in which the corresponding corner parts are in contact with each other, thereby capable of form a structure that covers the top, bottom, left, and right of the battery cell stack 200. For this purpose, the upper cover 310 and the U-shaped frame 320 may be made of a metal material having a predetermined strength. However, the module frame 300 is not limited thereto, and may be a mono frame in the form of a metal plate in which upper and lower surfaces and both side surfaces are integrated.

The end plate 600 is located on the open first side (x-axis direction) and the second side (x-axis direction) of the module frame 300, so that it can be formed so as to cover the front and rear surfaces of the battery cell stack 200. Thereby, the end plate 600 may physically protect the battery cell stack 200 and other electrical components from external impact.

Meanwhile, although it is not specifically shown in the figure, a busbar frame on which the busbar is mounted and an insulating cover for electrical insulation, etc. may be located between the battery cell stack 200 and the end plate 600.

As another example, the battery module 100 may have a structure in which at least a part of the components such as the module frame 300, the end plate 600, the busbar frame (not shown), and the insulating cover (not shown) are eliminated. In other words, the battery module 100 may have a structure in which components in a battery module unit are minimized. As an example, the battery module 100 may have a structure in which the module frame 300 and the end plate 600 are omitted. Thereby, in the battery pack 1000 according to the present embodiment, the battery module 100 omits at least some of the battery module units, so that the weight of the battery pack 1000 can be reduced, and the battery capacity can be improved.

Next, a structure in which the battery module 100 includes the heat sink 500 will be mainly described. Here, the bottom part of the module frame 300 may constitute an upper plate of the heat sink 500, and the bottom part of the module frame 300 can come into contact with the refrigerant supplied into the heat sink 500.

The heat sink 500 may be located under the module frame 300. More specifically, the heat sink 500 and the lower part of the module frame 300 may be directly coupled to each other by a method such as welding. Here, the heat sink 500 may include a recessed part 510 that is a path through which the refrigerant flows The recessed part 510 of the heat sink 500 corresponds to a part in which the lower plate 210 is recessed downward. The recessed part 510 may be a U-shaped tube with a cross section cut in the xz plane perpendicular to the direction in which the refrigerant flow path extends, and the bottom part of the module frame 300 may be located on the opened upper side of the U-shaped tube. As the heat sink 500 comes into contact with the bottom part of the module frame 300, the space between the recessed part 510 and the bottom part of the module frame 300 becomes a region through which the refrigerant flows, that is, the flow path of the refrigerant. Thereby, the bottom part of the module frame 300 may be in direct contact with the refrigerant.

The method for manufacturing the recessed part 510 of the heat sink 500 is not particularly limited, but a structure in which a regressed part is formed with respect to the plate-shaped heat sink 500, the U-shaped recessed part 510 with an opened upper side may be formed.

Further, the bottom part of the module frame 300 may be joined to a portion of the heat sink 500 in which the recessed part 510 is not formed through welding. In the present embodiment, through the integrated cooling structure of the bottom part of the module frame 300 and the heat sink 500, not only the above-mentioned cooling performance is improved but also the load of the battery cell stack 200 housed in the module frame 300 is reduced, thereby having the effect of supporting and reinforcing the stiffness of the battery module 100. In addition, since the heat sink 500 and the bottom part of the module frame 300 are sealed through welding, etc., the refrigerant may flow in the recessed part 510 without leakage.

For effective cooling, it is preferable to form the recessed part 510 over the entire area corresponding to the bottom part of the module frame 300 as shown in FIG. 8. For this purpose, the recessed part 510 may be bent at least once to lead from one side to the other. In particular, the recessed part 510 is preferably bent several times in order to form the recessed part 510 over the entire area corresponding to the bottom part of the module frame 300. As the refrigerant moves from the start point to the end point of the refrigerant passage formed over the entire area corresponding to the bottom part of the module frame 300, the entire area of the battery cell stack 200 can be efficiently cooled. Meanwhile, the refrigerant is a medium for cooling and is not particularly limited, but may be cooling water.

The device according to another embodiment of the present disclosure include the above-mentioned battery pack. Such a device can be applied to a vehicle means such as an electric bicycle, an electric vehicle, or a hybrid vehicle, but the present disclosure is not limited thereto, and is applicable to various devices that can use a battery module and a battery pack including the same, which is also falls within the scope of the present disclosure.

Although preferred embodiments of the present disclosure have been described in detail above, the scope of the present disclosure is not limited thereto, and numerous other modifications and embodiments can be devised by those skilled in the art, without departing from the spirit and scope of the principles of the invention described in the appended claims.

The invention claimed is:

1. A battery pack comprising:
a lower pack frame on which a plurality of battery modules are mounted;
an upper pack frame located on an upper part of the plurality of battery modules; and
a gasket part,
wherein the lower pack frame comprises a bottom part in contact with a lower surface of the plurality of battery modules and a frame part in contact with at least one side surface of at least one of the plurality of battery modules,
wherein the frame part comprises a side surface frame extending from an edge of the bottom part toward the upper part, and an inner frame located inside the side surface frame,
wherein the inner frame comprises at least one venting hole that penetrates an outer surface of the inner frame,
wherein the inner frame serves as a path through which a gas generated in the at least one of the plurality of battery modules moves, and
wherein the gasket part is located between the inner frame and the upper pack frame.

2. The battery pack according to claim 1, wherein:
the plurality of battery modules are partitioned from each other by the side surface frame and the inner frame.

3. The battery pack according to claim 1, wherein:
the inner frame comprises a horizontal beam extending along a longitudinal direction of the lower pack frame, and at least two vertical beams extending in a direction perpendicular to the horizontal beam.

4. The battery pack according to claim 3, wherein:
the at least one venting hole is formed on an outer surface of the horizontal beam located between adjacent vertical beams among the at least two vertical beams, and the horizontal beam includes a path through which the gas generated in the at least one of the plurality of battery modules moves.

5. The battery pack according to claim 4, wherein:
the at least one venting hole penetrates the outer surface of the horizontal beam.

6. The battery pack according to claim 3, wherein:
at least one rupture part is formed on one surface of the side surface frame extending in a direction perpendicular to the horizontal beam, and
the at least one rupture part is ruptured when a pressure inside the battery pack reaches a certain level or higher.

7. The battery pack according to claim 6, wherein:
the at least two vertical beams located adjacent to one surface of the side surface frame on which the rupture part is formed are spaced apart from each other.

8. The battery pack according to claim 7, wherein:
one end of the horizontal beam extends up to one vertical beam located adjacent to one surface of the side surface frame in which the rupture part is formed from among the at least two vertical beams, and
the one end of the horizontal beam is opened towards the side surface frame.

9. The battery pack according to claim 7, wherein:
one end of the horizontal beam extends up to one surface of the side surface frame in which the at least one rupture part is formed, and
the one end of the horizontal beam is in contact with the one surface of the side surface frame, with the one surface of the side surface frame and the one end of the horizontal beam in communication with each other.

10. The battery pack according to claim 1, wherein:
the inner frame comprises a horizontal beam extending along a longitudinal direction of the lower pack frame, and at least two vertical beams extending in a direction perpendicular to the horizontal beam.

11. The battery pack according to claim 10, wherein:
the gasket part comprises a first gasket part and a second gasket part, and
the first gasket part is located on the horizontal beam, and the second gasket part is located on the at least two vertical beams, respectively.

12. The battery pack according to claim 11, further comprising:
an inter busbar that is electrically connected to the plurality of battery modules,
wherein the inter busbar extends along at least one of the first gasket part and the second gasket part, and is mounted on at least one of the first gasket part and the second gasket part.

13. The battery pack according to claim 12, wherein:
the inter busbar is sealed with a heat resistant rubber.

14. A device comprising the battery pack according to claim 1.

* * * * *